United States Patent
Cazzani et al.

(10) Patent No.: US 12,356,114 B2
(45) Date of Patent: Jul. 8, 2025

(54) VIRTUAL PRIVACY CURTAIN

(71) Applicant: Cisco Technology, Inc., San Jose, CA (US)

(72) Inventors: Dario Cazzani, New York, NY (US); William Reed, Tiburon, CA (US); Mitchell Mosure, Madison, WI (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 324 days.

(21) Appl. No.: 17/967,201

(22) Filed: Oct. 17, 2022

(65) Prior Publication Data

US 2024/0129435 A1     Apr. 18, 2024

(51) Int. Cl.
| | |
|---|---|
| H04N 7/15 | (2006.01) |
| G06T 5/70 | (2024.01) |
| G06T 7/10 | (2017.01) |
| G06T 7/73 | (2017.01) |
| G06V 10/74 | (2022.01) |
| H04N 7/14 | (2006.01) |

(52) U.S. Cl.
CPC ............. *H04N 7/152* (2013.01); *G06T 5/70* (2024.01); *G06T 7/10* (2017.01); *G06T 7/73* (2017.01); *G06V 10/761* (2022.01); *H04N 7/147* (2013.01); *G06V 2201/07* (2022.01)

(58) Field of Classification Search
CPC .......... H04N 7/152; H04N 7/147; H04N 7/15; H04N 7/14; G06T 5/70; G06T 7/10; G06T 7/73; G06T 2207/20081; G06T 2207/30196; G06T 5/77; G06V 10/761; G06V 2201/07; G06V 40/10; G06V 10/74
See application file for complete search history.

(56) References Cited

U.S. PATENT DOCUMENTS

| | | | |
|---|---|---|---|
| 11,182,879 B1 | 11/2021 | Haslam et al. | |
| 2013/0194375 A1* | 8/2013 | Michrowski | H04N 23/815 348/14.07 |
| 2014/0362163 A1 | 12/2014 | Winterstein et al. | |

(Continued)

OTHER PUBLICATIONS

Purkayastha, M., "Monocular Depth Estimation and Background/Foreground Extraction using UNet Deep Learning Architecture," https://medium.com/analytics-vidhya/monocular-depth-estimation-and-background-foreground-extraction-using-unet-deep-learning-bdfd19909aca, Jul. 27, 2020, 20 pages.

(Continued)

*Primary Examiner* — Yosef K Laekemariam
(74) *Attorney, Agent, or Firm* — Edell, Shapiro & Finnan, LLC

(57) ABSTRACT

Presented herein are techniques to process an image for a video conference. A method includes obtaining an image from a camera, identifying a first person and a second person in the image, labeling pixels in the image belonging to the first person and to the second person, determining a first distance between the first person and the camera and a second distance between the second person and the camera, and based on the first distance and the second distance, selectively removing or blurring at least one of the first person and the second person from the image, before transmitting the image to an endpoint of a video conference, by manipulating the pixels in the image belonging to the at least one of the first person and the second person.

20 Claims, 5 Drawing Sheets

(56) References Cited

U.S. PATENT DOCUMENTS

| | | |
|---|---|---|
| 2018/0365809 A1 | 12/2018 | Cutler et al. |
| 2019/0215464 A1 | 7/2019 | Kumar et al. |
| 2023/0079886 A1* | 3/2023 | Amirghodsi ......... G06V 10/771 |
| | | 706/25 |
| 2023/0291993 A1* | 9/2023 | Vaezi Joze ........... G06V 40/103 |

OTHER PUBLICATIONS

Bandyopadhyay, H., "The Definitive Guide to Instance Segmentation [+V7 Tutorial]," Blog, Computer Vision, https://www.v7labs.com/blog/instance-segmentation-guide, Oct. 7, 2022, 25 pages.

Wikipedia, "Procrustes analysis," https://en.wikipedia.org/wiki/Procrustes_analysis, retrieved Oct. 17, 2022, 5 pages.

* cited by examiner

VIRTUAL PRIVACY CURTAIN

TECHNICAL FIELD

The present disclosure relates to enhancements for video conferencing, and particularly for a video conference taking place in a crowded area or where people might become unintended participants in the video conference.

BACKGROUND

Video conference calls can be made using a wide variety of devices, such as office video conferencing systems, personal computers, and telephone devices including mobile telephones. Thus, video conferencing can be used at many different locations, including company offices, private residences, internet cafés and even on the street. The many possibilities and varied locations for holding video conferences can create a problem since the video conference camera reveals the location of the participant, along with any unintended participants, to all those watching or participating in the video conference. For instance, if a video conference call is made from a participant's private place of residence, the participant's privacy may be compromised since the participant's private environment and members of his or her household may be exposed and photographed during the video conference call. Likewise, in crowded environments such as offices, cafes, restaurants, or call centers, people in the background or close to a participant (unintended participants) can be distracting to other, far-end, video conference participants.

DETAILED DESCRIPTION

Overview

Figure 1:
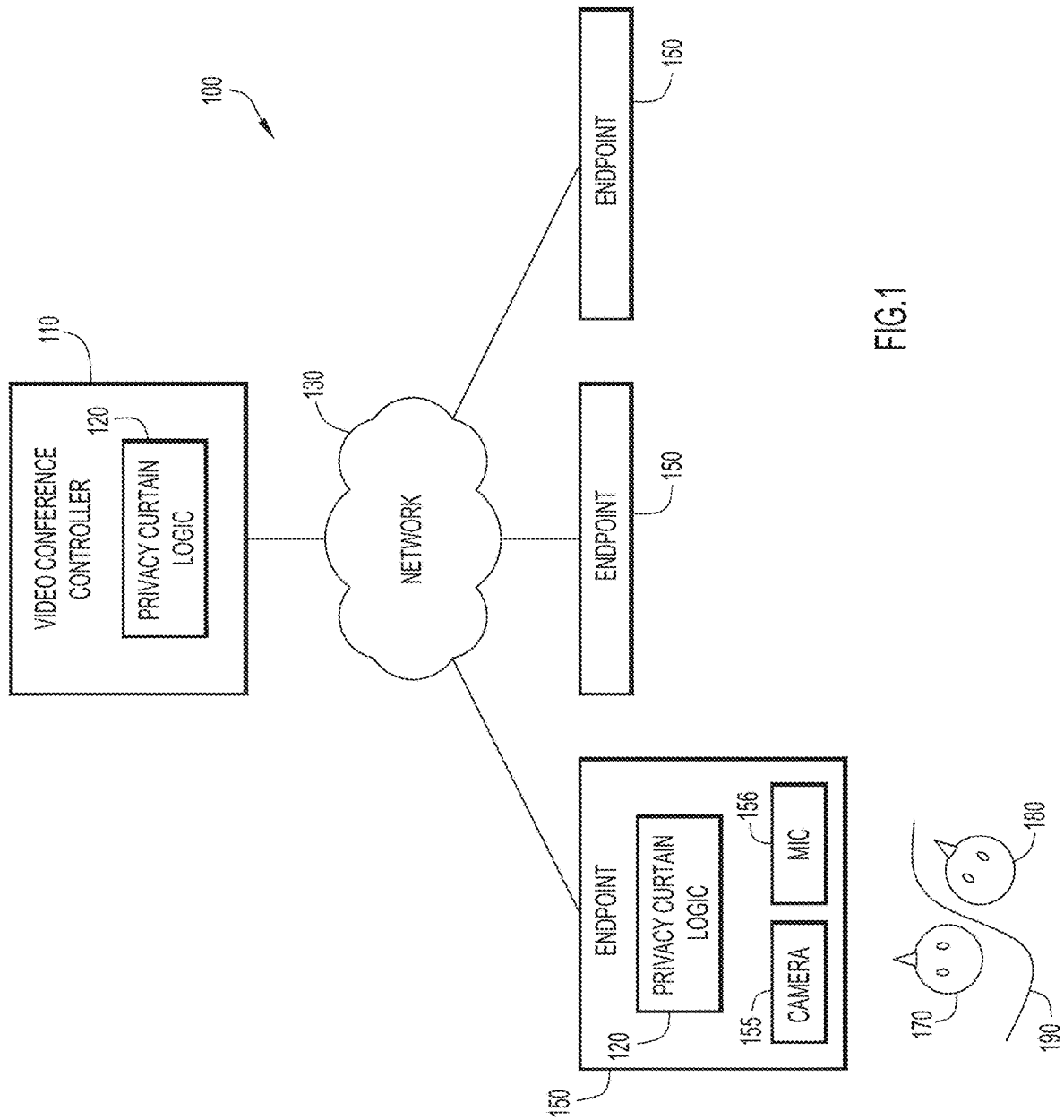
FIG. 1 shows a network topology including privacy curtain logic hosted by at least one of a video conference controller and a video conference endpoint, in accordance with an example embodiment.

Presented herein are techniques to process an image for a video conference. A method includes obtaining an image from a camera, identifying a first person and a second person in the image, labeling pixels in the image belonging to the first person and to the second person, determining a first distance between the first person and the camera and a second distance between the second person and the camera, and based on the first distance and the second distance, selectively removing or blurring at least one of the first person and the second person from the image, before transmitting the image to an endpoint of a video conference, by manipulating the pixels in the image belonging to the at least one of the first person and the second person.

In another embodiment, an apparatus is provided. The apparatus may include a network interface configured to enable network communications, a memory configured to store logic instructions, and a processor, when executing the logic instructions, configured to: obtain an image from a camera, identify a first person and a second person in the image, label pixels in the image belonging to the first person and to the second person, determine a first distance between the first person and the camera and a second distance between the second person and the camera, and based on the first distance and the second distance, selectively remove or blur at least one of the first person and the second person from the image, before transmitting the image to an endpoint of a video conference, by manipulating the pixels in the image belonging to the at least one of the first person and the second person.

Example Embodiments

When conducting a videoconference in crowded environments such as offices, cafes, restaurants, or call centers, it can be important to hide people in the background of the camera image. Such hiding or blurring effectively provides a "private room," even in a crowded environment. The embodiments described herein are configured to selectively exclude some people from a video stream based on their relative distance to the camera and/or pose, and effectively establish a "privacy curtain" behind or around a selected video conference participant. The privacy curtain is implemented by manipulating individual pixels of an image that are associated with one or more persons.

In one embodiment, one or more machine learning models are leveraged to determine multiple keypoints or face/body landmarks for persons in a camera image. Those keypoints are then leveraged to determine a distance from the camera to each person in the image, as well as a pose of each person. With this information, it is then possible to manipulate pixels that belong to, or that are associated with, each of the persons to be blurred or removed from the image by, e.g., changing the color of the pixels to a predetermined color, or by a dynamically changing the color/brightness of the appropriate pixels, as the case may be.

In other words, and at high level, the approach includes, using a trained machine learning (ML) model, first performing instance segmentation to identify each person in the scene of a camera image and associating pixels in the image with each respective individual person. The approach, still using the ML model, then predicts face and body landmarks for each person to determine, e.g., their location, pose, and distance from the camera.

To determine distance, it is noted that the size of the iris of people is substantially consistent across the world population. Consequently, distance from the camera can thus be based on the focal length of the camera, the size of the detected iris in pixels, and the constant size of the iris in millimeters.

Pose can be determined using processes such as Procrustes analysis, but those skilled in the art will appreciate that there are other techniques to determine the pose of each person in an image. Knowing the pose (head and/or body) of a person in the image can help distinguish the most "prominent" person in the scene, even when other participants are at similar distances from the camera. Once the most prominent person (or intended participant) in the scene is identified, a privacy curtain may be "built" behind or around that person by removing, via pixel manipulation, other persons from the scene or image that are evidently not intended to be participants in the video conference.

Thus, this approach is configured to hide anyone in the background when the intended participant is in a busy environment, such as a cafe or a call center. The embodiments described herein using segmentation efficiently to precisely hide persons who are behind the intended participant or that are not as prominent as the intended participant.

Reference is now made to the figures, beginning with FIG. 1, which shows a network topology 100 including privacy curtain logic 120 hosted by at least one of a video conference controller 110 and a video conference endpoint 150, in accordance with an example embodiment. More specifically, network topology 100 includes video conference controller 110 that is connected via network 130 to at least one video conference endpoint 150. In this case, either video conference controller 110 or video conference endpoint 150 may host privacy curtain logic 120, which is described more fully below. Video conference controller 110 and video conference endpoint 150 may be configured as a computing device 500, as described in connection with FIG. 5. In operation, video conference controller 110 provides video conferencing services to one or more video conference endpoints 150. Such a video conference service might include both video and audio. In this regard, video conference endpoint 150 may include a camera 155 and associated microphone 156.

FIG. 1 also shows two potential video conference participants 170, 180. As can be seen in the figure, potential video conference participant 170 is closer to the camera 155 and is also looking towards (pose is towards) camera 155. In contrast, potential video conference participant 180 is further away from camera 155 and their pose suggests that they are not looking in the direction of camera 155. Assuming potential video conference participant 170 is determined to be the intended video conference participant, then as will be explained further below, a privacy curtain 190 (or virtual wall) may be built behind or around potential video conference participant 170 by manipulating pixels associated with potential video conference participant 180.

Figure 2:
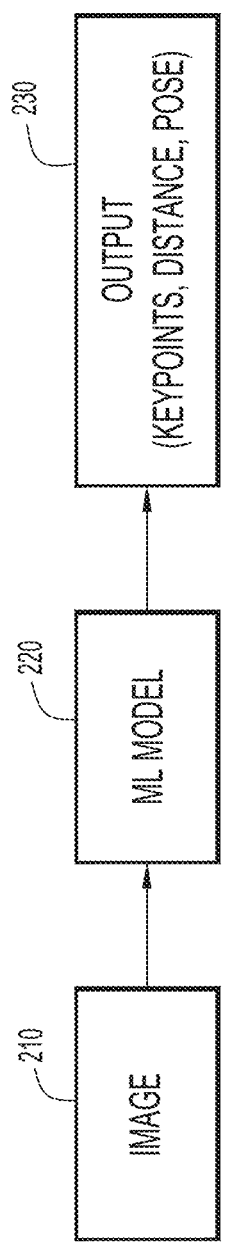
FIG. 2 shows the use of a machine learning model, which may be part of privacy curtain logic, which receives a camera images and outputs multiple parameters, in accordance with an example embodiment.

FIG. 2 shows the use of a machine learning (ML) model 220, which may be part of privacy curtain logic 120, that receives a camera image(s) 210, and outputs multiple parameters, in accordance with an example embodiment. That is, and as alluded to above, ML model 220 may be configured to generate multiple keypoints (in some cases, identifying 400-500 different face/body landmarks). These keypoints are then leveraged by ML model 220 itself, or one or more other processes, to determine the distance between each identified person in the camera image 210 and camera 155, and each person's pose, together output 230.

Figure 3:
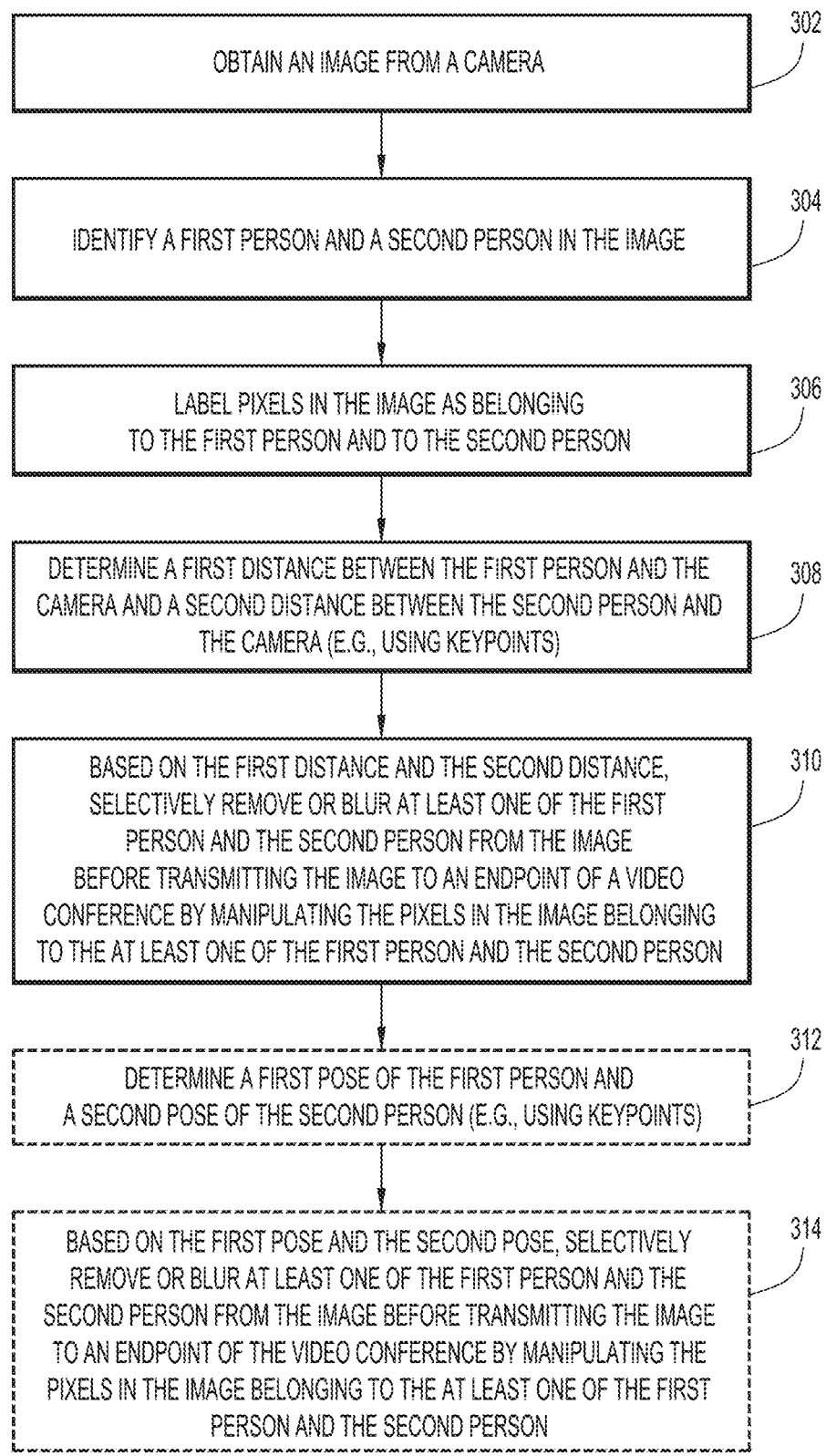
FIG. 3 shows a series of operations performed by privacy curtain logic, in accordance with an example embodiment.

FIG. 3 shows a series of operations performed by privacy curtain logic 120, in accordance with an example embodiment. Specifically, at 302, an operation is configured to obtain an image from a camera. At 304, an operation is configured to identify a first person and a second person in the image. These persons may be, e.g., potential video conference participant 170 and potential video conference participant 180. At 306, an operation is configured to label pixels in the image as belonging to the first person and to the second person. This operation may be understood as image segmentation where pixels in an image are associated with given respective persons in the image. At 308, an operation is configured to determine a first distance between the first person and the camera, and to determine a second distance between the second person and the camera. These distances may be determined based on one or more keypoints identified during image segmentation.

At 310, an operation is configured to, based on the first distance and the second distance, selectively remove or blur at least one of the first person and the second person from the image before transmitting the image to a video conference endpoint 150 by manipulating the pixels in the image belonging to at least one of the first person and the second person. That is, once a first person is identified as the intended participant in the video conference, e.g., potential video conference participant 170, then the other person, e.g., potential video conference participant 180, can be removed or blurred by manipulating the pixels associated with the second person.

For still additional selectively or accuracy in determining which person should be identified as the intended participant in the video conference, at 312, an operation may be configured to determine a first pose of the first person and a second pose of the second person. The pose of the first person and the pose of the second person may be determined based on one or more keypoints identified by ML model 220. Then, at 314, an operation may be configured to, based on the first pose and the second pose, selectively remove or blur at least one of the first person and the second person from the image before transmitting the image to a video conference endpoint 150 of the video conference by manipulating the pixels in the image belonging to the at least one of the first person and the second person.

The following provides additional detail regarding the operation of privacy curtain logic 120. Privacy curtain logic 120 may include or have access to ML model 220. ML model 220 is configured to predict the location of multiple persons in a scene as well as face and body landmarks on each person. In one possible implementation, ML model 220 labels each pixel in a video frame based on which person it belongs to. If, e.g., an input video frame is 720×1280 pixels, ML model 220 labels all 921,600 pixels. This labelling provides the ability to, among other things, represent a silhouette of a given person with "pixel perfect" accuracy.

ML model 220 may also label 400-500 keypoints (face/body) for each person. These keypoints are used by privacy curtain logic 120 to determine the distance of each person from camera 155 and their head/body pose (i.e., where they are looking), e.g., towards camera 155 like potential video conference participant 170, or away from camera 155 like potential video conference participant 180.

Given, as described above, that privacy curtain logic 120 can determine the silhouette of each person in the scene or image, their relative distances, and where they are looking, privacy curtain logic 120 is configured to determine which people to remove or blur from the scene according to the following using the following procedure.

First, privacy curtain logic 120 determines who is closest to camera 155.

If the detected people are within a maximum distance of camera 155, they become a candidate to include in the scene; people that are beyond that maximum distance, even if they are the closest person, may still be hidden from the scene.

If more than one person is within the maximum distance, the closest person may be included and the other people would be excluded.

If there is more than one person at a similar close distance, privacy curtain logic 120 include all of them in the scene if they are also looking (their pose is) toward camera 155.

If some people are not looking at camera 155, privacy curtain logic 120 may hide them and only show the closest person, who is also looking at camera 155.

In order to avoid flickering or jitter when someone is moving closer or further away or is looking away and back to camera 155, privacy curtain logic 120 may implement a smoothing process (or delay) to wait a certain minimum time before changing state (i.e., determining anew which person is to be included or excluded from the scene).

Figure 4:
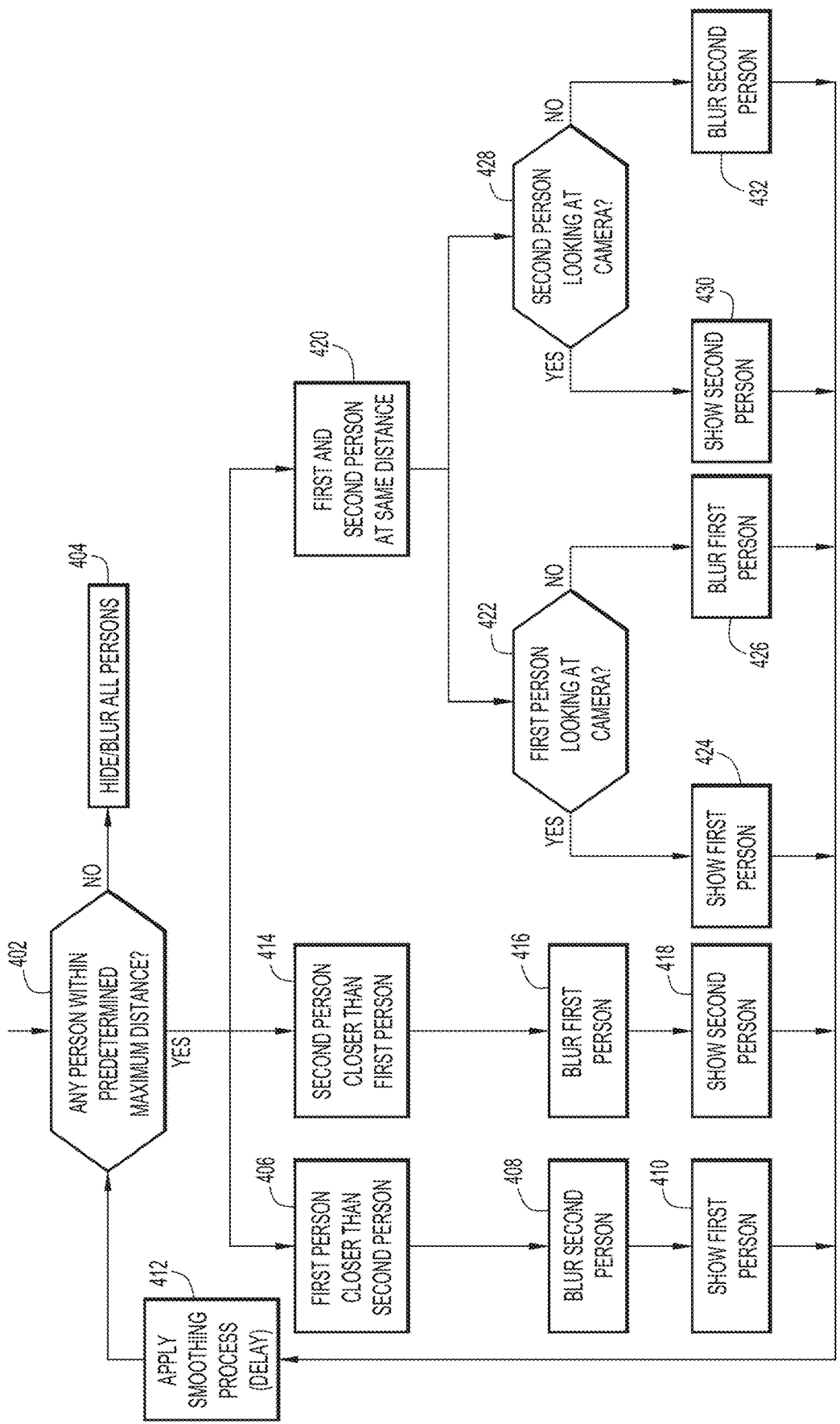
FIG. 4 shows another series of operations performed by privacy curtain logic, in accordance with an example embodiment.

FIG. 4 shows another series of operations performed by privacy curtain logic 120, in accordance with an example embodiment. The series of operations begins at 402, where an operation is configured to determine whether any person in the scene or image is within a predetermined maximum distance. If there are no people within the predetermined maximum distance then, at 404, an operation is configured to hide or blur all persons in the image.

For simplicity, the following discussion is based on two persons in the image, but those skilled in the art will appreciate that more than two people can be processed at a time by privacy curtain logic 120. Given a total of two people, there are three cases: a first person is closer to the camera than a second person (indicated at 406), the second person is closer to the camera than the first person (indicated at 414), or both the first person and the second person are at the same distance from the camera (indicated at 420). From 406, where the first person is closer than the second person, at 408, an operation is configured to blur the second person and, at 410, an operation is configured to show the first person.

From 414, where the second person is closer than the first person, at 416, an operation is configured to blur the first person and, at 418, an operation is configured to show the second person.

From 420, where the first person and the second person are at the same distance, privacy curtain logic 120 is configured to determine at, 422, whether the first person is looking at the camera. If yes, at 424, privacy curtain logic 120 is configured to show the first person. If, at 422, the first person is not looking at the camera then, at 426, an operation is configured to blur the first person. Similarly, privacy curtain logic 120 is configured to determine at, 428, whether the second person is looking at the camera. If yes, at 430, privacy curtain logic 120 is configured to show the second person. If, at 428, the second person is not looking at the camera then, at 432, an operation is configured to blur the second person.

After any of 410, 418, 424, 426, 430, or 432, at 412, an operation is configured to apply a smoothing process (or delay) to preclude undesirable jitter in the image being transmitted to a far end video conferencing endpoint 150. The delay may be implemented between successive images received from the camera.

Example Scenarios

Given the discussion above, those skilled in the art will appreciate that privacy curtain logic 120 may operate in the context of the following scenarios.

Scenario 1. Person 1 is in an office. They are having a video conferencing meeting. There are two people sitting behind Person 1 at desks, that also have their backs to Person 1. Privacy curtain logic 120 would show Person 1 and hide the other two people. The decision to hide the other two people is based on being further away than Person 1 from the camera and also because they are facing away.

Scenario 2. Two people are sitting next to each other at a table in a cafe. Person 1 is looking at the camera. Person 2 just happens to be next to Person 1, but is talking to someone else and looking away from the camera. Privacy curtain logic 120 would hide Person 2 from the scene and only Person 1 would be visible to the remote meeting participant on the video conferencing call. This is similar to what is depicted in FIG. 1.

If Person 1 were to move in front of Person 2 or partially occlude Person 2 by waving their hand in front of Person 2, privacy curtain logic 120 would still include Person 1's hand in the scene and hide the rest of Person 2. This is possible because privacy curtain logic 120 knows, pixel by pixel, which pixel belongs to Person 1 and to Person 2. As such, privacy curtain logic 120 can hide or show Person 1 or a portion of that person, even in cases where they overlap in the scene.

Scenario 3. Person 1 is having a meeting and is looking at the camera. Someone knocks at the door behind Person 1. Person 1 gets up to answer the door, but they are still within camera range. However, because Person 1 end up beyond the maximum distance from the camera (and potentially looking away as well), privacy curtain logic 120 would hide Person 1. This could ensure a form of privacy in cases where person 1 is in a meeting, but is no longer engaged in it.

Figure 5:
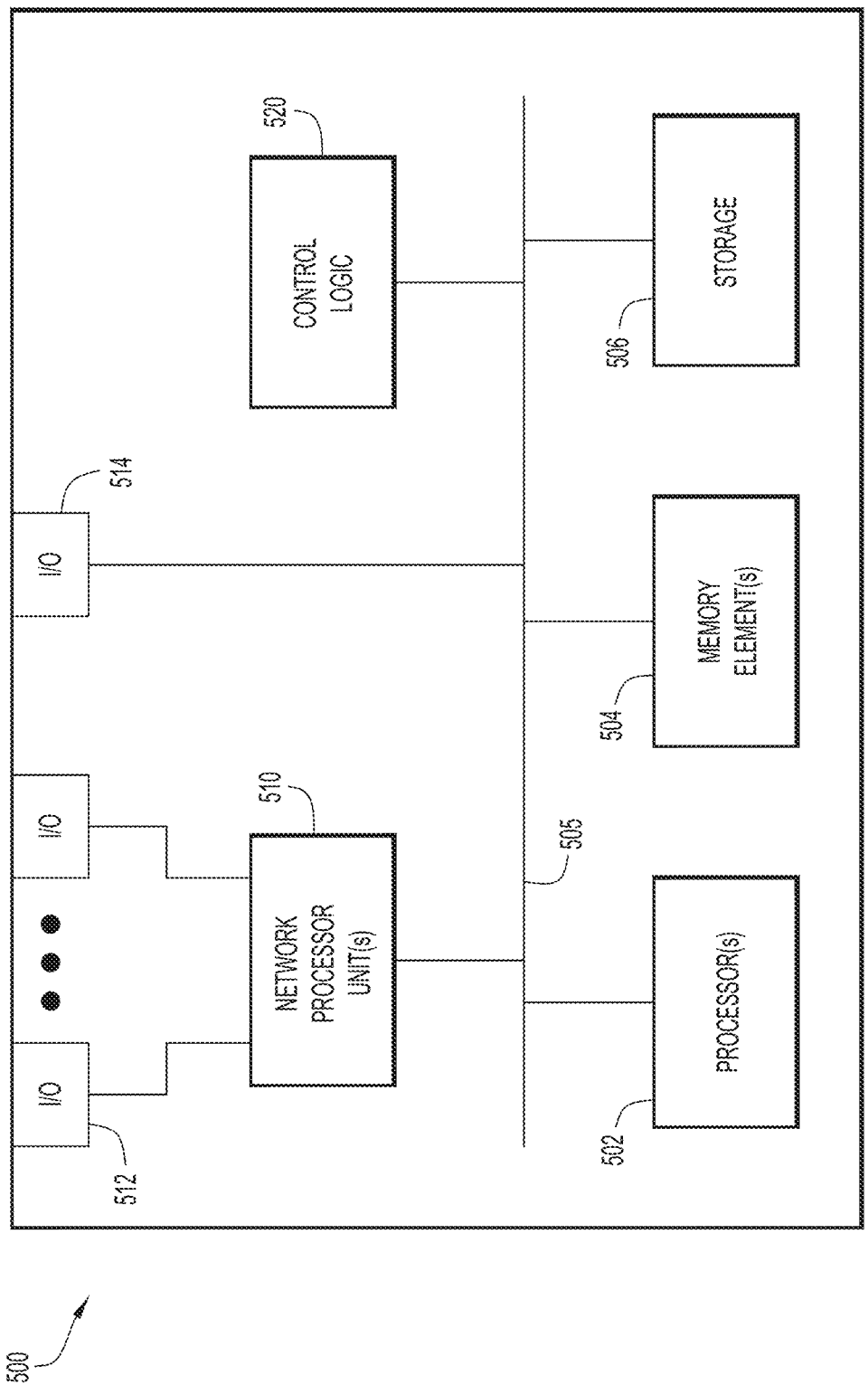
FIG. 5 illustrates a system that may be configured to host privacy curtain logic, in accordance with an example embodiment.

FIG. 5 illustrates a hardware block diagram of a computing device 500 that may perform functions associated with operations discussed herein in connection with the techniques depicted in FIGS. 1-4. In various embodiments, a computing device, such as computing device 500 or any combination of computing devices 500, may be configured as any entity/entities as discussed for the techniques depicted in connection with FIGS. 1-4 in order to perform operations of the various techniques discussed herein.

In at least one embodiment, the computing device 500 may include one or more processor(s) 502, one or more memory element(s) 504, storage 506, a bus 505, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa), or can overlap/exist in any other suitable manner.

In at least one embodiment, bus 505 can be configured as an interface that enables one or more elements of computing device 500 to communicate in order to exchange information and/or data. Bus 505 can be implemented with any architecture designed for passing control, data and/or information between processors, memory elements/storage, peripheral devices, and/or any other hardware and/or software components that may be configured for computing device 500. In at least one embodiment, bus 505 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, and/or any other I/O port(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computing device 500. For example, I/O interface(s) 514 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software (potentially inclusive of object code and source code), etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm·wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In sum, a method may be provided. The method may include obtaining an image from a camera, identifying a first person and a second person in the image, labeling pixels in the image belonging to the first person and to the second person, determining a first distance between the first person and the camera and a second distance between the second person and the camera, and based on the first distance and the second distance, selectively removing or blurring at least one of the first person and the second person from the image, before transmitting the image to an endpoint of a video conference, by manipulating the pixels in the image belonging to the at least one of the first person and the second person.

In the method, labeling pixels in the image may be performed by a machine learning model that identifies a plurality of keypoints for each of the first person and the second person.

The method may further include determining the first distance and the second distance using the machine learning model and the plurality of keypoints.

The method may further include determining a first pose of the first person and a second pose of the second person based on the plurality of keypoints, and based on the first pose and the second pose, selectively removing or blurring the at least one of the first person and the second person from the image, before transmitting the image to an endpoint of a video conference, by manipulating the pixels in the image belonging to the at least one of the first person and the second person.

The method may further include, based on the first pose and the second pose, determining that the at least one of the first person and the second person is an intended participant of the video conference.

The method may further include applying a smoothing process between successive images from the camera.

In the method, the smoothing process may include applying a predetermined delay before determining the first distance between the first person and the camera and the second distance between the second person and the camera on a subsequent image from the camera.

The method may further include establishing, by manipulating the pixels in the image, a virtual wall between the first person and the second person based on the first distance and the second distance.

In the method, the virtual wall may occlude at least a portion of the first person or a portion of the second person from the image before transmitting the image to the endpoint of the video conference.

In the method, identifying the first person and the second person in the image, and labeling pixels in the image as belonging to the first person and to the second person may include segmenting the image pixel by pixel.

An apparatus may also be provided. The apparatus may include a network interface configured to enable network communications, a memory configured to store logic instructions, and a processor, when executing the logic instructions, configured to: obtain an image from a camera, identify a first person and a second person in the image, label pixels in the image belonging to the first person and to the second person, determine a first distance between the first person and the camera and a second distance between the second person and the camera, and based on the first distance and the second distance, selectively remove or blur at least one of the first person and the second person from the image, before transmitting the image to an endpoint of a video conference, by manipulating the pixels in the image belonging to the at least one of the first person and the second person.

In the apparatus, the processor may be configured to label pixels in the image using a machine learning model that identifies a plurality of keypoints for each of the first person and the second person.

In the apparatus, the processor may be further configured to determine the first distance and the second distance using the machine learning model and the plurality of keypoints.

In the apparatus, the processor may be further configured to determine a first pose of the first person and a second pose of the second person based on the plurality of keypoints, and based on the first pose and the second pose, selectively remove or blur the at least one of the first person and the second person from the image, before transmitting the image to an endpoint of a video conference, by manipulating the pixels in the image belonging to the at least one of the first person and the second person.

In the apparatus, the processor may be further configured to, based on the first pose and the second pose, determine that the at least one of the first person and the second person is an intended participant of the video conference.

In the apparatus, the processor may be further configured to apply a smoothing process between successive images from the camera.

In the apparatus, the smoothing process may include applying a predetermined delay before determining the first distance between the first person and the camera and the second distance between the second person and the camera on a subsequent image from the camera.

In still another form, a non-transitory computer readable storage media is provided. The non-transitory computer readable storage media may be encoded with instructions that, when executed by a processor, cause the processor to: obtain an image from a camera, identify a first person and a second person in the image, label pixels in the image belonging to the first person and to the second person, determine a first distance between the first person and the camera and a second distance between the second person and the camera, and based on the first distance and the second distance, selectively remove or blur at least one of the first person and the second person from the image, before transmitting the image to an endpoint of a video conference, by manipulating the pixels in the image belonging to the at least one of the first person and the second person.

The non-transitory computer readable storage media may be encoded with instructions that, when executed by the processor, cause the processor to label pixels in the image using a machine learning model that identifies a plurality of keypoints for each of the first person and the second person.

The non-transitory computer readable storage media may be encoded with instructions that, when executed by the processor, cause the processor to: determine a first pose of the first person and a second pose of the second person based on the plurality of keypoints, and based on the first pose and the second pose, selectively remove or blur the at least one of the first person and the second person from the image, before transmitting the image to an endpoint of a video conference, by manipulating the pixels in the image belonging to the at least one of the first person and the second person.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
obtaining an image from a camera;
identifying a first person and a second person in the image;
labeling pixels in the image as belonging to the first person and to the second person;
determining a first distance between the first person and the camera and a second distance between the second person and the camera;
determining at least one of a first pose of the first person and a second pose of the second person based on a plurality of keypoints for each of the first person and the second person; and
based on the first distance and the second distance, and the at least one of the first pose of the first person and the second pose of the second person, selectively removing or blurring at least one of the first person and the second person from the image, before transmitting the image to an endpoint of a video conference, by manipulating the pixels in the image belonging to the at least one of the first person and the second person.

2. The method of claim 1, wherein labeling pixels in the image is performed by a machine learning model that identifies the plurality of keypoints for each of the first person and the second person.

3. The method of claim 2, further comprising determining the first distance and the second distance using the machine learning model and the plurality of keypoints.

4. The method of claim 2, further comprising determining the first pose of the first person and the second pose of the second person based on the plurality of keypoints.

5. The method of claim 4, further comprising, based on the at least one of the first pose of the first person and the second pose of the second person, determining that the at least one of the first person and the second person is an intended participant of the video conference.

6. The method of claim 1, further comprising applying a smoothing process between successive images from the camera.

7. The method of claim 6, wherein the smoothing process comprises applying a predetermined delay before determining the first distance between the first person and the camera and the second distance between the second person and the camera on a subsequent image from the camera.

8. The method of claim 1, further comprising establishing, by manipulating the pixels in the image, a virtual wall between the first person and the second person based on the first distance and the second distance.

9. The method of claim 8, wherein the virtual wall occludes at least a portion of the first person or a portion of the second person from the image before transmitting the image to the endpoint of the video conference.

10. The method of claim 1, wherein identifying the first person and the second person in the image, and labeling pixels in the image as belonging to the first person and to the second person comprises segmenting the image, pixel by pixel.

11. An apparatus comprising:
a network interface configured to enable network communications;
a memory configured to store logic instructions; and
a processor, when executing the logic instructions, configured to:
obtain an image from a camera;
identify a first person and a second person in the image;
label pixels in the image as belonging to the first person and to the second person;
determine a first distance between the first person and the camera and a second distance between the second person and the camera;
determine at least one of a first pose of the first person and a second pose of the second person based on a plurality of keypoints for each of the first person and the second person; and
based on the first distance and the second distance, and the at least one of the first pose of the first person and the second pose of the second person, selectively remove or blur at least one of the first person and the second person from the image, before transmitting the image to an endpoint of a video conference, by manipulating the pixels in the image belonging to the at least one of the first person and the second person.

12. The apparatus of claim 11, wherein the processor is further configured to label pixels in the image using a machine learning model that identifies the plurality of keypoints for each of the first person and the second person.

13. The apparatus of claim 12, wherein the processor is further configured to determine the first distance and the second distance using the machine learning model and the plurality of keypoints.

14. The apparatus of claim 12, wherein the processor is further configured to determine the first pose of the first person and the second pose of the second person based on the plurality of keypoints.

15. The apparatus of claim 14, wherein the processor is further configured to, based on the at least one of the first pose of the first person and the second pose of the second person, determine that the at least one of the first person and the second person is an intended participant of the video conference.

16. The apparatus of claim 11, wherein the processor is further configured to apply a smoothing process between successive images from the camera.

17. The apparatus of claim 16, wherein the smoothing process comprises applying a predetermined delay before determining the first distance between the first person and the camera and the second distance between the second person and the camera on a subsequent image from the camera.

18. A non-transitory computer readable storage media encoded with instructions that, when executed by a processor, cause the processor to:
obtain an image from a camera;
identify a first person and a second person in the image;
label pixels in the image as belonging to the first person and to the second person;
determine a first distance between the first person and the camera and a second distance between the second person and the camera;
determine at least one of a first pose of the first person and a second pose of the second person based on a plurality of keypoints for each of the first person and the second person; and
based on the first distance and the second distance, and the at least one of the first pose of the first person and the second pose of the second person, selectively remove or blur at least one of the first person and the second person from the image, before transmitting the image to an endpoint of a video conference, by manipulating the pixels in the image belonging to the at least one of the first person and the second person.

19. The non-transitory computer readable storage media of claim 18, encoded with instructions that, when executed by the processor, cause the processor to label pixels in the image using a machine learning model that identifies the plurality of keypoints for each of the first person and the second person.

20. The non-transitory computer readable storage media of claim 19, encoded with instructions that, when executed by the processor, cause the processor to:
  determine the first pose of the first person and the second pose of the second person based on the plurality of keypoints.

* * * * *